(12) United States Patent
Ono et al.

(10) Patent No.: US 6,450,646 B1
(45) Date of Patent: Sep. 17, 2002

(54) DISPLAY UNIT

(75) Inventors: Hiroyuki Ono, Tokyo; Susumu Yamada, Chiba; Hiroshi Takatsuka, Kanagawa; Makoto Shinoda, Tokyo, all of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/537,889

(22) Filed: Mar. 29, 2000

(30) Foreign Application Priority Data

Mar. 31, 1999 (JP) .............................. 11-090720

(51) Int. Cl.[7] .............................................. G03B 21/16
(52) U.S. Cl. .............................. 353/57; 353/61; 353/74
(58) Field of Search .............................. 353/52, 57, 58, 353/60, 61, 56, 74, 75

(56) References Cited

U.S. PATENT DOCUMENTS

| | | | | |
|---|---|---|---|---|
| 5,278,596 A | * | 1/1994 | Machtig | 353/122 |
| 5,808,704 A | * | 9/1998 | Yoshikawa et al. | |
| 5,860,720 A | * | 1/1999 | Negishi et al. | 353/74 |
| 2001/0022650 A1 | * | 9/2001 | Ono | 353/52 |

* cited by examiner

*Primary Examiner*—William Dowling
(74) *Attorney, Agent, or Firm*—Frommer Lawrence & Haug LLP; William S. Frommer; Matthew K. Ryan

(57) ABSTRACT

In a display unit wherein an optical block is disposed inside of a housing having a screen at its front, and an image light from the optical block is projected on the screen, a display unit in which the housing is made a closed structure and a path is provided for circulating air between the housing and the optical block so that dust is prevented from entering inside of an apparatus and attaching to optical parts, and at the same time, heat generated in the apparatus can be sufficiently cooled.

11 Claims, 11 Drawing Sheets

DISPLAY UNIT

BACKGROUND OF THE INVENTION

1. Field of the Invention

The present invention relates to a new display unit, and particularly to an art for effectively performing cooling without damaging closed environment.

2. Description of the Related Art

For example, in the case of a liquid-crystal projector system for displaying an image by irradiating the light emitted from a light source onto a liquid-crystal light bulb and projecting the light passing through the liquid-crystal light bulb on a screen by a projection lens, various cooling methods have been used so far in order to prevent temperatures of the liquid-crystal light bulb and various optical components from rising due to the heat of the light source.

For example, there is a method of performing the cooling by supplying outside air into the housing of the liquid-crystal projector system by using a fan.

However, a method of cooling a housing by supplying outside air into the housing by a fan has a problem that not only the outside air but also dust are taken in at the same time and the dust attaches to a liquid-crystal light bulb and various optical component.

As a result, a problem occurs that the dust interrupts or diffuses the transmitted light of the liquid-crystal light bulb and thereby, stains or bleeding is produced on an image.

Therefore, in order to prevent the attachment of the dust, it is generally carried out that a dust-removing filter is attached to an outside-air intake.

However, even if the dust-removing filter is attached, it is impossible to remove dust smaller than the mesh of the filter. Therefore, a problem occurs that fine dust accumulates in the liquid-crystal projector system and dust attaches to the liquid-crystal light bulb and the various optical components in any case.

Moreover, in the case of this method, a problem occurs that the filter must be frequently cleaned although the filter is incomplete as dust-removing means.

Furthermore, when using a fan, the fan emits noises to the outside of the housing of the liquid-crystal projector system. Therefore, a problem occurs that unnecessary noises other than voices are produced while operating the liquid-crystal projector system and cause a user or audience to feel an uncomfortable sense.

Furthermore, a method of constituting an optical block including a liquid-crystal light bulb into a closed type in a liquid-crystal projector system and circulating air into the inside of the optical block is considered as a cooling method other than the above method.

To use the above method, however, there is a problem that it is necessary to improve the radiating performance of the closed optical block because the air capacity in the optical block is small and thereby, the structure of the liquid-crystal projector system becomes complex.

SUMMARY OF THE INVENTION

Therefore, it is an object of the present invention to prevent dust from entering a system and attaching to optical components as well as to be able to sufficiently cool the heat produced in the system.

To solve the above problems, a display unit of the present invention comprises a housing having a screen at its front and constituted by a closed structure, an optical block set in the closed housing, and connecting means for connecting the housing with the optical block to circulate air.

Therefore, the display unit of the present invention makes it possible to cool the optical block by circulating air between the housing and the optical block through the connecting means and cooling the air during its circulation. Moreover, because the optical block is located in the closed housing, any dust does not enter the optical block from the outside.

Furthermore, another display unit of the present invention comprises a housing having a screen at its front and constituted by a closed structure, an optical block set in the closed housing, first cooling means for cooling a light source, and second cooling means for cooling the optical block.

Therefore, because the another display unit of the present invention makes it possible to separately use the first cooling means and the second cooling means correspondingly to the light source and the optical block, it is possible to use proper cooling means correspondingly to the light source and the optical block greatly different from each other in calorific value. Therefore, it is possible to improve the cooling efficiencies of the light source and the optical block and moreover, more preferably constitute the display unit because degrees of freedom on the design of the light source and the optical block are increased.

DESCRIPTION OF THE PREFERRED EMBODIMENTS

Figure 1:
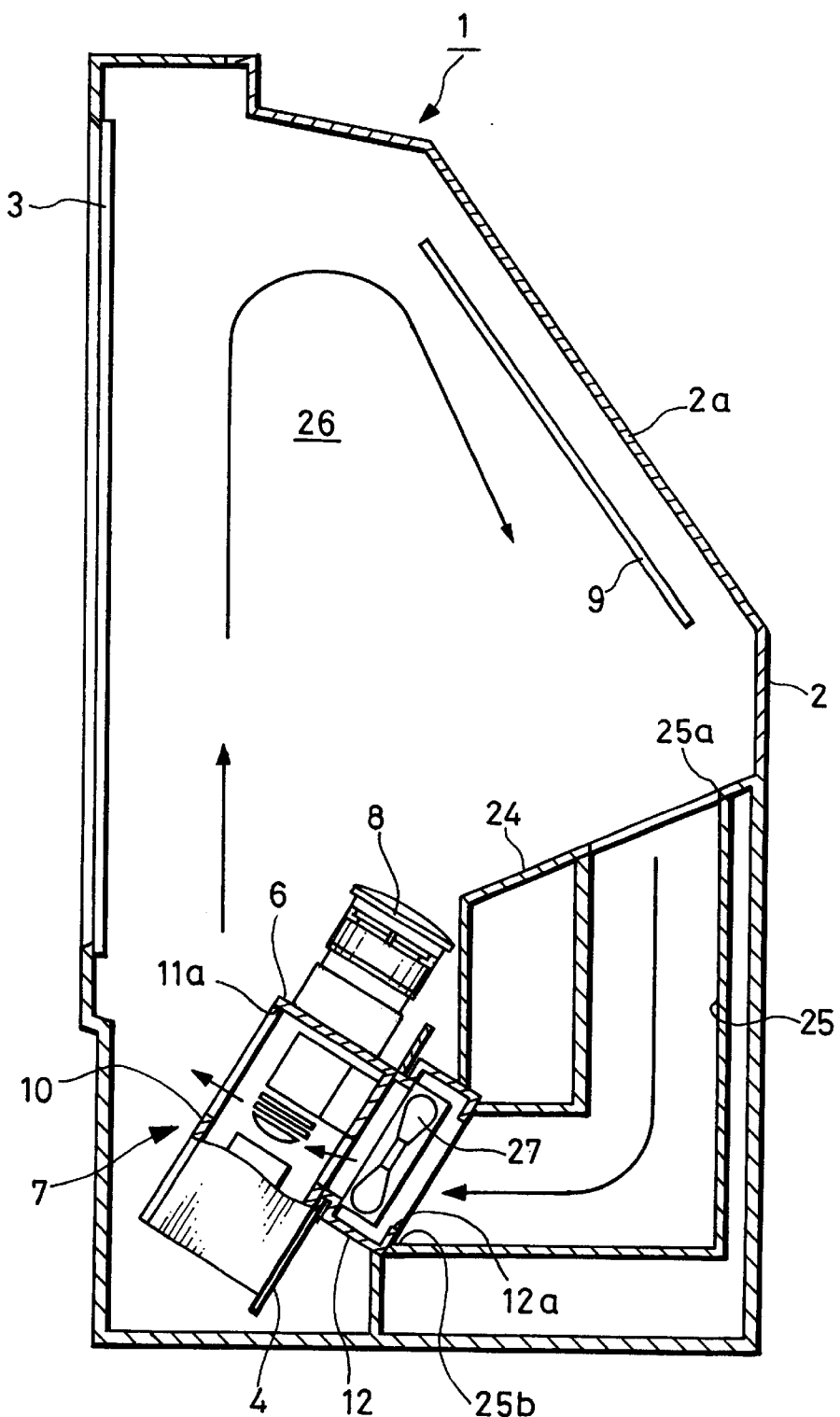
FIG. 1 is a longitudinal sectional view of a first embodiment obtained by applying the present invention to a liquid-crystal projector system together with FIGS. 2 to 4.

Embodiments of display units of the present invention are described below by referring to the accompanying drawings. The embodiments shown in the accompanying drawings are those obtained by applying the present invention to a liquid-crystal projector system.

FIGS. 1 to 4 show a first embodiment of a display unit according to the present invention.

A liquid-crystal projector system 1 is provided with a housing 2 having a closed structure, in which a screen 3 is located at the front of the housing 2 and an optical-system-constituting unit 7 obtained by arranging a light source 5 and an optical block 6 on a substrate 4 is located at the lower portion in the housing 2.

The light projected from a projection lens 8 of the optical block 6 is reflected by a mirror 9 diposed at the back side in the housing 2 and advanced to the screen 3 at the front side.

Figure 2:
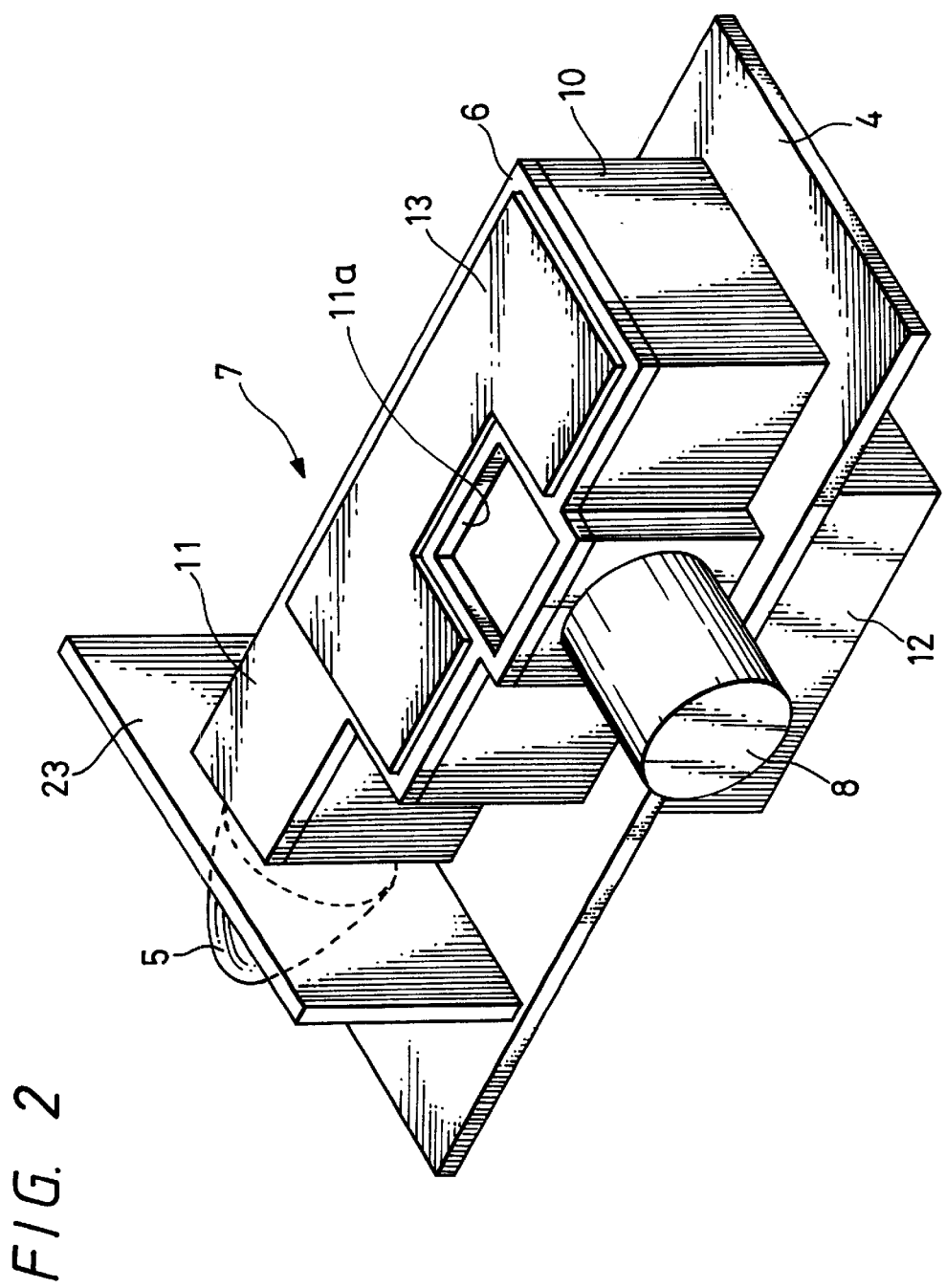
FIG. 2 is a perspective view of an optical-system-constituting unit.

As shown in FIG. 2, the optical-system-constituting unit 7 is constituted by arranging the light source 5 and the optical block 6 on the substrate 4.

The optical block 6 is provided with a case 10 and a lid 11 for closing the upperside of the case 10 and a duct 12 is provided below the front end of the case 10 so that the inside of the case 10 communicates with the duct 12. Moreover, the duct 12 has an opening 12a. Then, optical components are stored in the case 10 and a driving circuit 13 for driving a liquid-crystal light bulb to be described later is formed on the lid 11. Furthermore, an opening 11a is formed on the lid 11 so as to be able to perform registration of the liquid-crystal light bulb, that is, overlapping adjustment of an image through the opening 11a.

Figure 3:
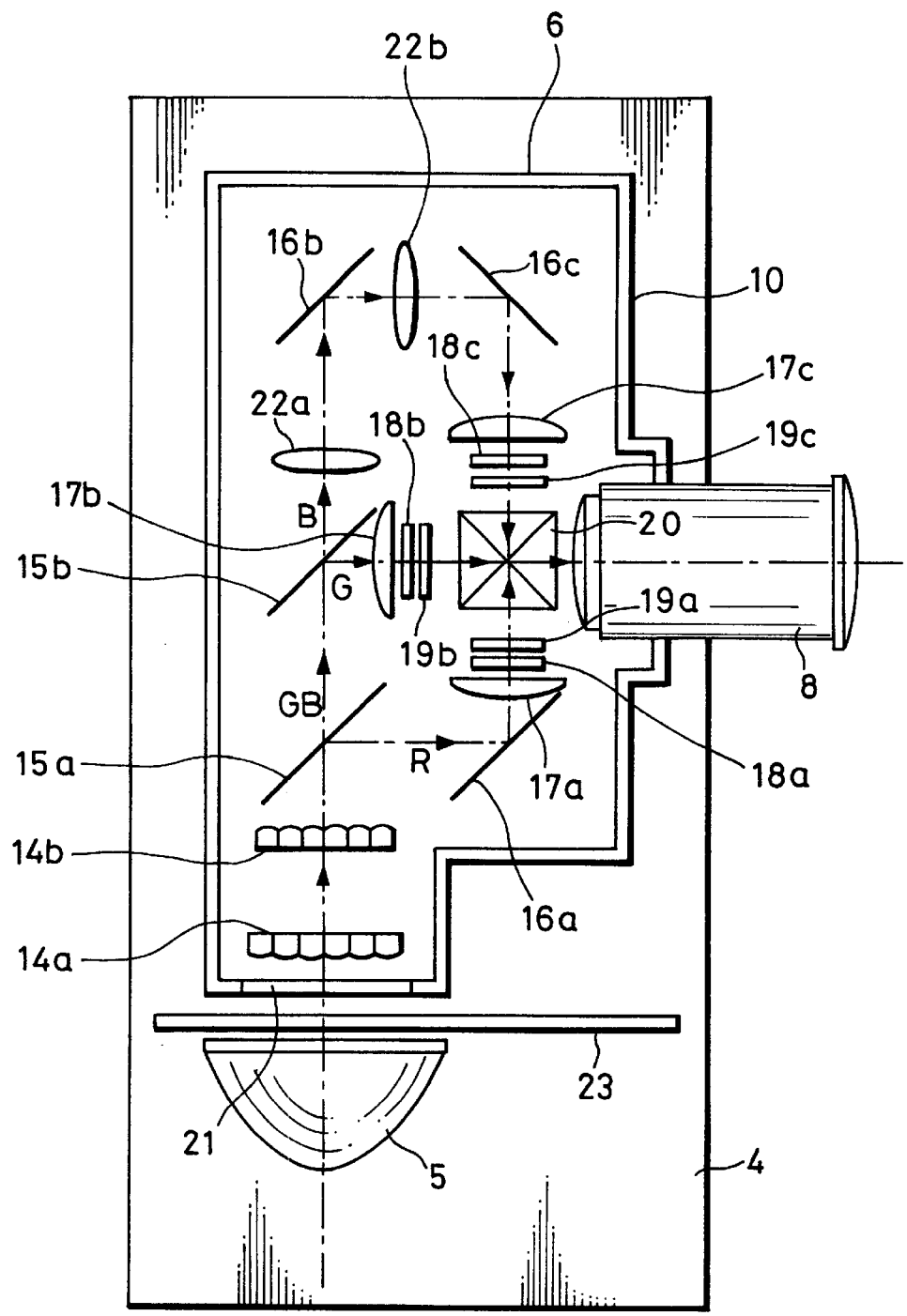
FIG. 3 is an illustration showing a configuration of an optical system of an optical block.
Figure 4:
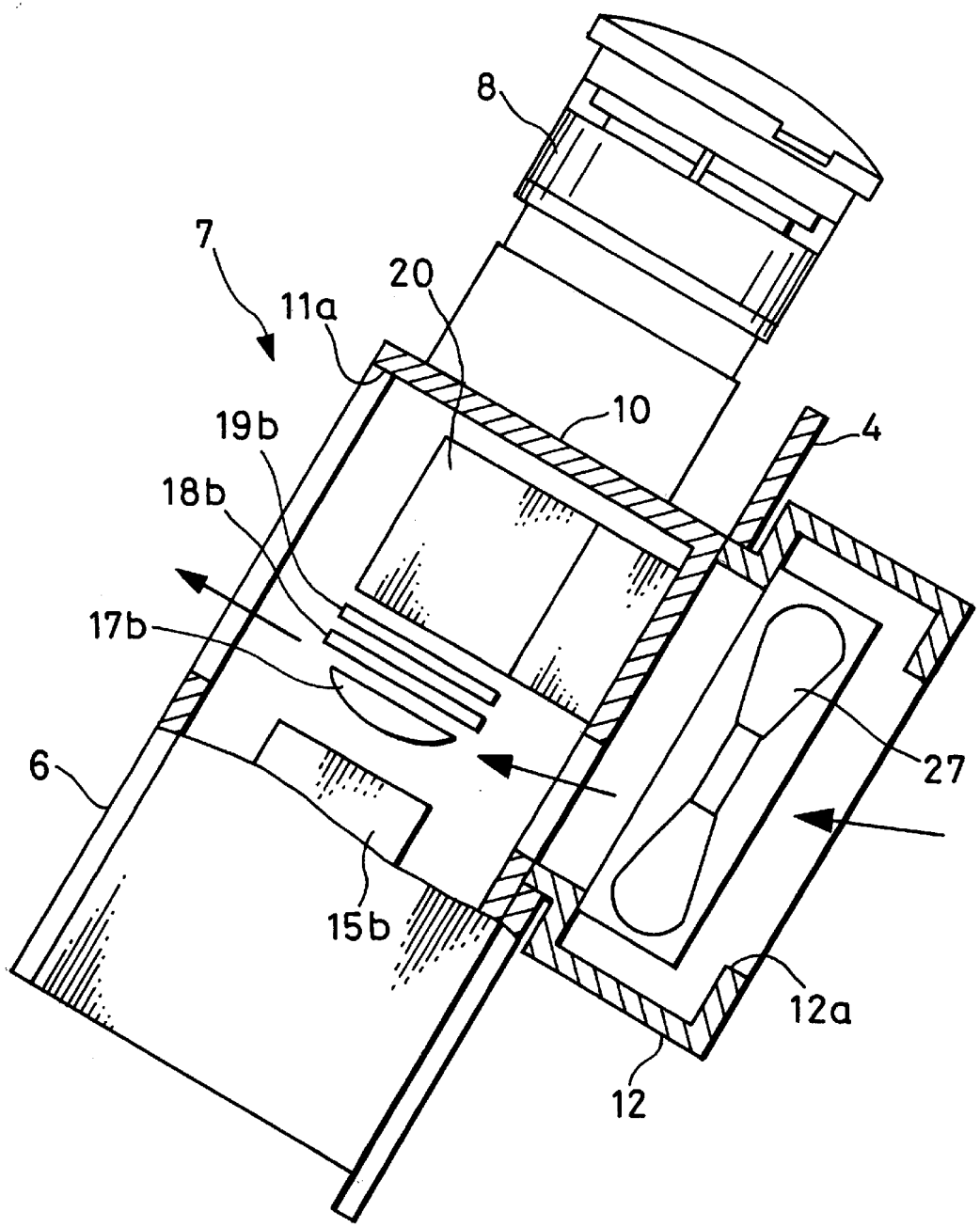
FIG. 4 is a sectional view showing an essential portion of an optical-system-constituting unit.

The optical block 6 moreover has the internal configuration shown in FIG. 3. That is, lens arrays 14a and 14b are arranged from the side of the light source 5 and moreover, dichroic mirrors 15a and 15b and reflectors 16a, 16b, and 16c for separating the light emitted from the light source 5 into three color lights of red, green, and blue (R, G, and B) and guiding them to the liquid crystal are arranged. Moreover, condensers 17a, 17b and 17c, polarizing plates 18a, 18b, and 18c, and liquid-crystal light bulbs 19a, 19b, and 19c are arranged on paths through which the separated respective lights pass so that each of three color lights enters each plane of a light-synthesizing prism 20 at the rear stage. Furthermore, a projection lens 8 for projecting a synthesized light is provided at the rear stage of the light-synthesizing prism 20.

A partition wall 23 is provided between the case 10 and the light source 5 to interrupt the space between the light source 5 serving as a heat source and the optical block 6.

The above-mentioned optical block 6 operates as described below.

The light emitted from the light source 5 such as a metal halide lamp or the like passes through a cut filter 21 for cutting off ultraviolet and infrared rays and enters the optical block 6. The cut filter 21 also has a function for closing the case 10 of the optical block 6.

The light entering the optical block 6 passes through the lens arrays 14a and 14b, and red light R is separated and reflected by the dichroic mirror 15a and then reflected by the reflector 16a, passes through the condenser 17a and the polarizing plate 18a, and moreover passes through the red liquid-crystal light bulb 19a.

Of green light G and blue light B passing through the dichroic mirror 15a, the green light G is separated and reflected by the dichroic mirror 15b, passes through the condenser 17b and the polarizing plate 18b, and moreover passes through the green liquid-crystal light bulb 19b.

Moreover the blue light B passing through the dichroic mirror 15b is reflected by the reflectors 16b and 16c, passes through the condenser 17c and the polarizing plate 18c, and moreover passes through the blue liquid-crystal light bulb 19c. In the figure, symbols 22a and 22b denote relay lens.

Then, the lights passing through the liquid-crystal light bulbs 19a, 19b, and 19c enter the light-synthesizing prism 20 where the lights are synthesized, and the synthesized light is enlarged and projected on the screen 3 by the projection lens 8. Thus, an image is displayed on the screen 3 by the optical block 6.

Then, a mechanism for cooling the optical block 6 will be explained below.

As described above, the optical-system constituting unit 7 is located at the front lower portion of the housing 2, a closed path-forming section 24 is provided at the rear lower-half portion of the housing 2, a path 25 formed on the path-forming section 24 opens at the upside and at the front lower portion of the path-forming section 24, an upside opening 25a communicates with a large space 26 of the housing 2, and an opening 25b at the front lower portion is connected with the opening 12a of the duct 12 of the optical block 6 in a closed state.

Moreover, a fan 27 is disposed in the duct 12 of the optical block 6.

When the above-described liquid-crystal projector system operates, the light emitted from the light source 5 heats the three-color liquid-crystal light bulbs 19a, 19b, and 19c, the polarizing plates 18a, 18b, and 18c and so on in the optical block 6, the air heated by the heat radiation from these optical components is exhausted from the opening 11a to the space 26 of the housing 2 through the forced circulation by the fan 27 provided in the duct 12 of the optical block 6.

As the air-flow generating means, it is also permitted to use not only the means for performing the forced circulation such as the above-mentioned fan 27 but also the natural convection that lightweight air heated in the case 10 of the optical block 6 goes into the space 26 from the opening 11a and new air comes in from the opening 12a of the duct 12 instead and thereby the air circulation is naturally generated.

Then, the heated air is exhausted to the large space 26 as described above and thereby, the heat of the air diffuses in the entire space 26 and moreover, it is exhausted to the outside through the housing 2 (mainly from the upside and back). Therefore, by forming the whole or a part of the housing 2 such as a tilted portion 2a of the housing 2 facing the mirror 9 with a material having a high heat conductivity such as a metal or the like, it is possible to increase the radiation effect. Moreover, by providing a fin for radiation to the portion 2a or other portions, it is possible to further increase the radiation effect.

Then, as described above, the cooled air circulates so that the air enters the case 10 of the optical block 6 through the duct 12 after passing through the path 25 from the space 26, cools the liquid-crystal light bulbs 19a, 19b, and 19c and the polarizing plates 18a, 18b, and 18c or the like, and is warmed through the cooling process and goes out to the space 26 through the opening 11a (refer to arrows in FIG. 1).

In the case of the optical block 6, a gap is formed between the reflectors 16a, 16b, and 16c, condensers 17a, 17b, and 17c, polarizing plates 18a, 18b, and 18c, liquid-crystal light bulbs 19a, 19b, and 19c, and the light-synthesizing prism 20 so that air can pass through the gaps and thereby, these optical components are effectively cooled.

Figure 5:
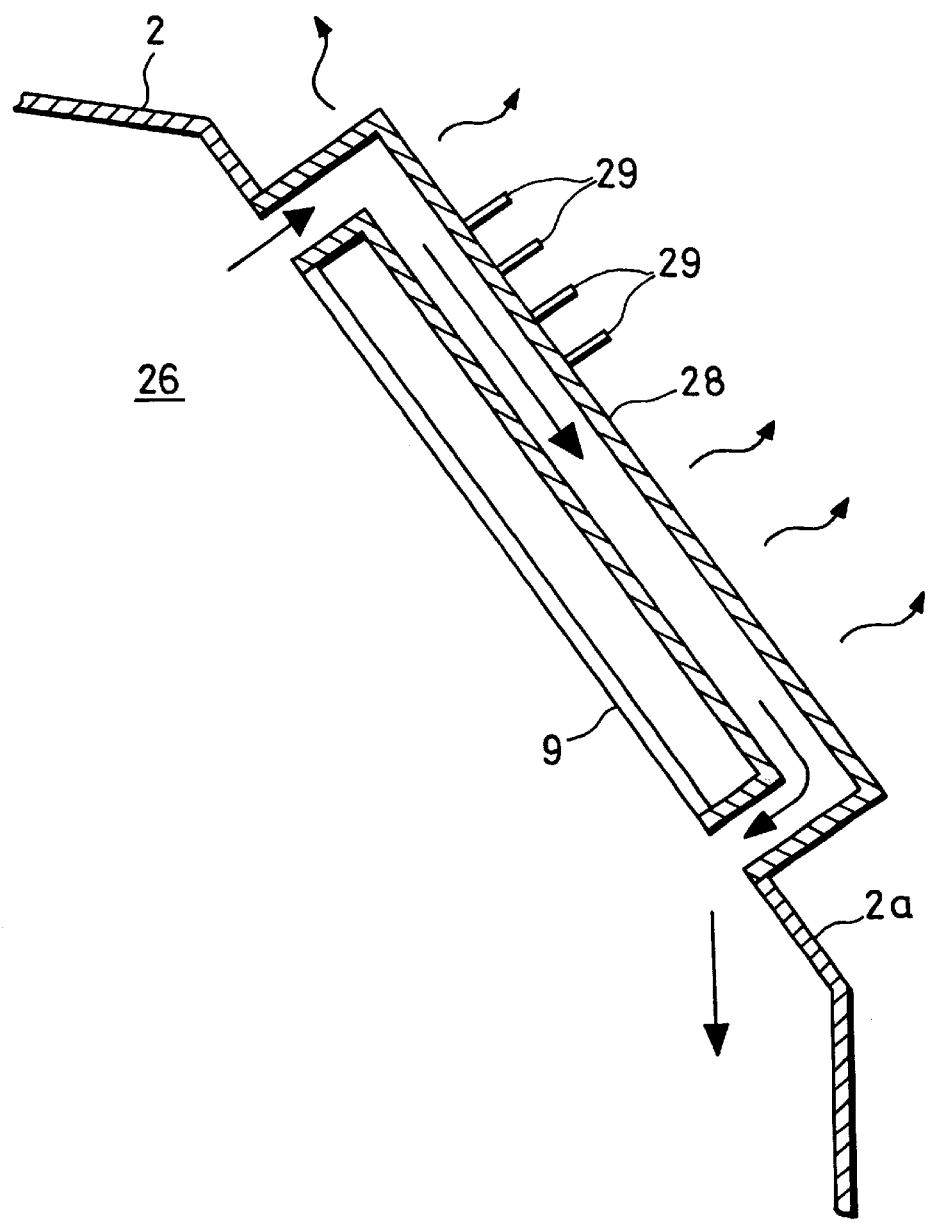
FIG. 5 is a sectional view of an essential portion showing a modification of heat radiating means.

FIG. 5 shows a modification of the heat radiating means to be provided in the housing 2.

The heat radiating means is a radiator 28 attached to the tilted wall 2a of the housing 2. The radiator 28 is formed like a pipe and attached to the tilted wall 2a of the housing 2 so that the both ends thereof communicates with the space 26.

Because the above-mentioned radiator 28 is exposed to the outside of the housing 2, it has a large surface area contacting with outside air and thereby, it is able to efficiently discharge the heat. Moreover, as illustrated, by attaching radiating fins 29, 29, . . . to the surface of the radiator 28, it is possible to further increase the radiation effect.

Figure 6:
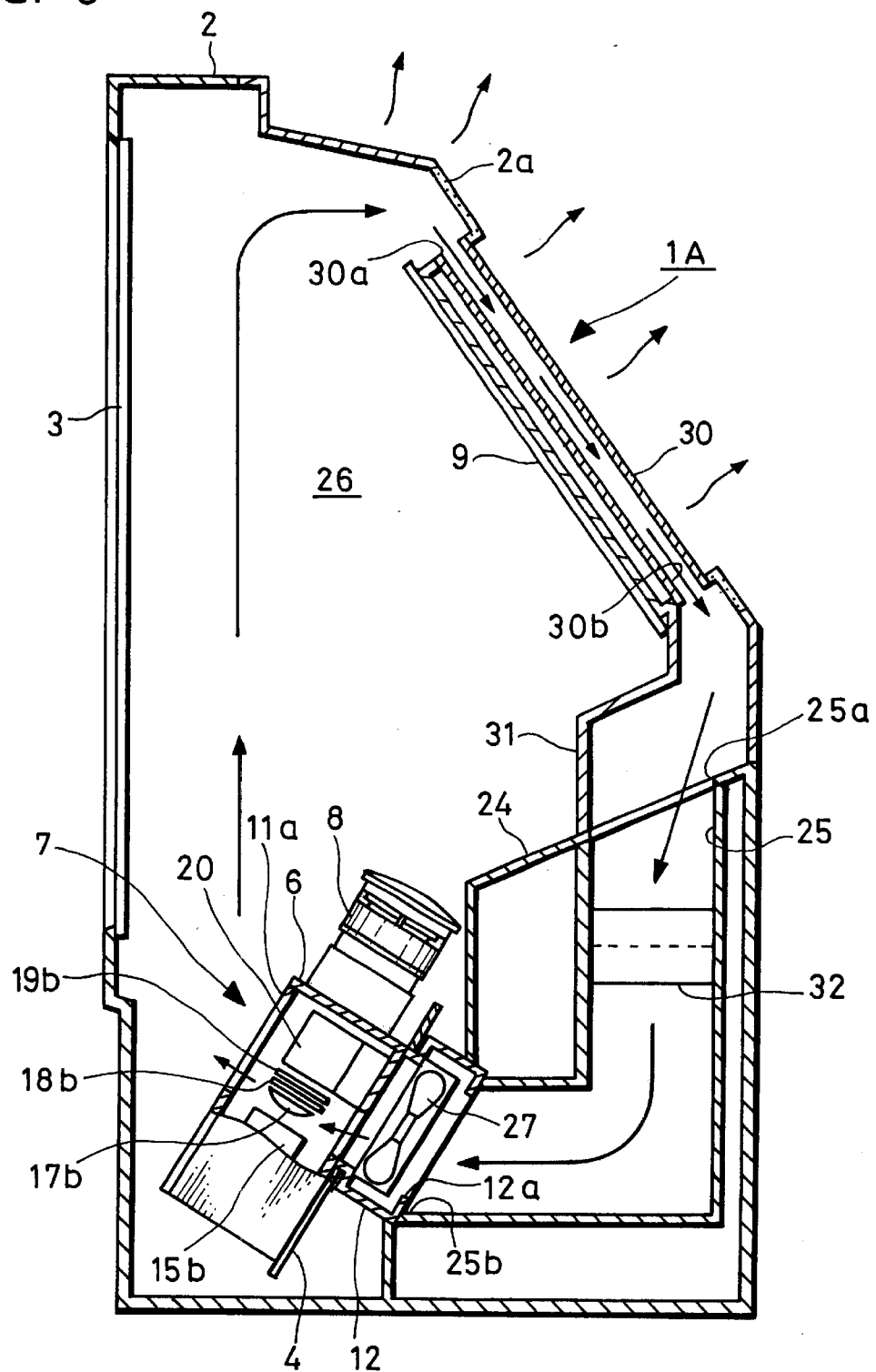
FIG. 6 is a longitudinal sectional view showing a second embodiment obtained by applying the present invention to a liquid-crystal projector system.

FIG. 6 shows a second embodiment obtained by applying the present invention to a liquid-crystal projector system so as to restrict the flow of the air reaching the upper portion of a space 26 up to a path 25.

In the case of the liquid-crystal projector system 1A according to the second embodiment, a pipe-shaped radiator 30 is disposed inside a tilted portion 2a of a housing 2 so as to contact with the outside air. Portions of the housing 2 with which a mirror 9 contacts, that is, the tilted portion 2a and a portion communicating with the upperside of the tilted portion 2a (portion provided with a translucent pattern in FIG. 6) are made of a material having a high heat conductivity such as a metal or the like.

Moreover, in order to prevent the air cooled after passing through the radiator 30 from mixing with the air heated by an optical block 6 and exhausted into a space 26, a partition wall 31 having a cylindrical rib for surrounding the outside of a cylindrical support portion is provided between the exit 30b of the radiator 30 and the upperside opening 25a of the path 25 so that the exit 30b of the radiator 30 is communicated with the upperside opening 25a of the path 25 in a closed state. Thereby, an air-flow restriction path is formed from the entrance 30a of the radiator 30 up to the opening 12a of a duct 12 of the optical block 6 through the upperside opening 25a of the path 25 and the path 25.

Thus, the air heated in the optical block 6 is exhausted to the space 26 of the housing 2 by an air flow generated by a fan 27 provided in the optical block 6 and moreover, moved to the upper portion of the space 26, and radiated at the upper portion of the housing 2, and enters the radiator 30.

The air entering the radiator 30 is cooled while passing through the radiator 30 and then, enters the optical block 6 through the path 25 after passing through the duct 12 again.

As described above, the airflow is restricted so that the heated air passes through the radiator 30 without failure and enters the optical block 6 again. Thereby, the air exhausted into the space 26 from the optical block 6 does not return to the optical block 6 again without passing through the radiator 30, the air once exhausted from the optical block 6 always enters the optical block 6 through the cooling step for passing through the radiator 30 and thereby, a temperature rise of optical components in the optical block 6 is securely suppressed.

Moreover, it is possible to locate a dust collector in the airflow restriction path or in the middle of the path 25. Thereby, it is possible to remove dust in the liquid-crystal projector 1A.

No dust enters the housing 2 and the optical block 6 having a closed structure from the outside and it is possible to remove dust by the dust collector 32, which has entered the space 26 and a space of the optical block 6 while the liquid-crystal projector system 1A is being manufactured as well as to completely eliminate an influence of the dust on an image.

It is preferable that the dust collector 32 mentioned above can be removed for cleaning and set to the predetermined position after cleaning again.

Figure 7:
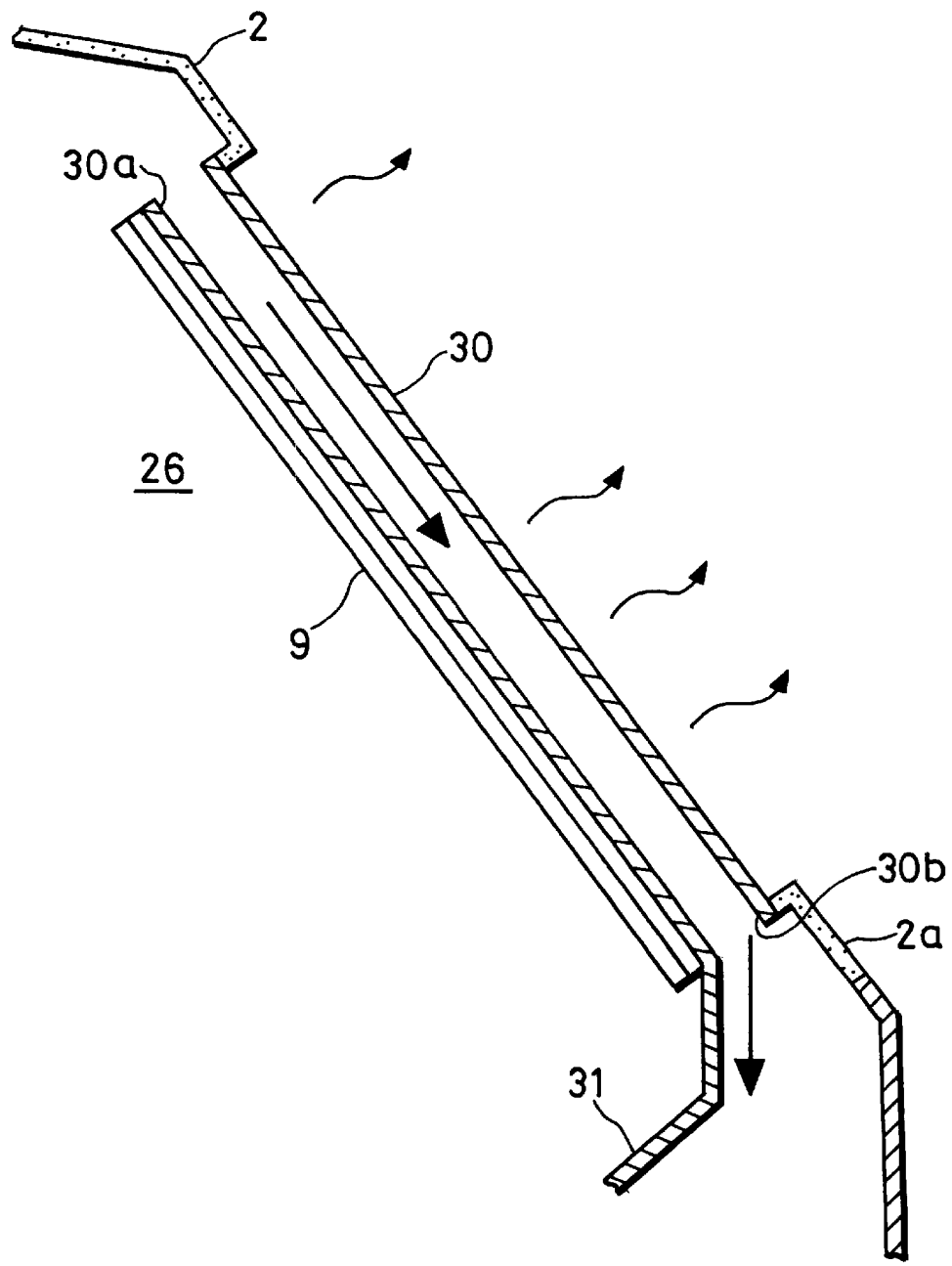
FIG. 7 is a sectional view of an essential portion showing a modification of a method for attaching a radiator.

The radiator 30 can be disposed so as to contact with the mirror 9 as shown in FIG. 7.

Moreover, it is possible to provide a plurality of the radiators 28 and 30 shown in FIGS. 5 to 7 in parallel along the back of the housing 2. Thus, it is possible to further improve the radiation efficiency.

According to each of the above embodiments, because the spaces 26 of the liquid-crystal projector systems 1 and 1A can be formed into a closed structure, it is possible to prevent any dust from entering the spaces 26 and the optical block 6 from the outside.

Moreover, because the optical block 6 is located in the closed space 26, it is possible to prevent fan noises from leaking to the outside even if the fan 27 is used.

Furthermore, it is possible to improve endothermic and heat radiation effects of the housing 2 by using a material superior in heat conductivity and heat radiation such as a metal or the like for the housing 2.

Furthermore, it is possible to improve endothermic and heat radiation effects of the case 10 of the optical block 6 by using a material superior in heat conductivity and heat radiation such as a metal or the like for the case 10 of the optical block 6 and thereby, further efficiently discharge heat in the optical block 6 to the space 26.

Figure 8:
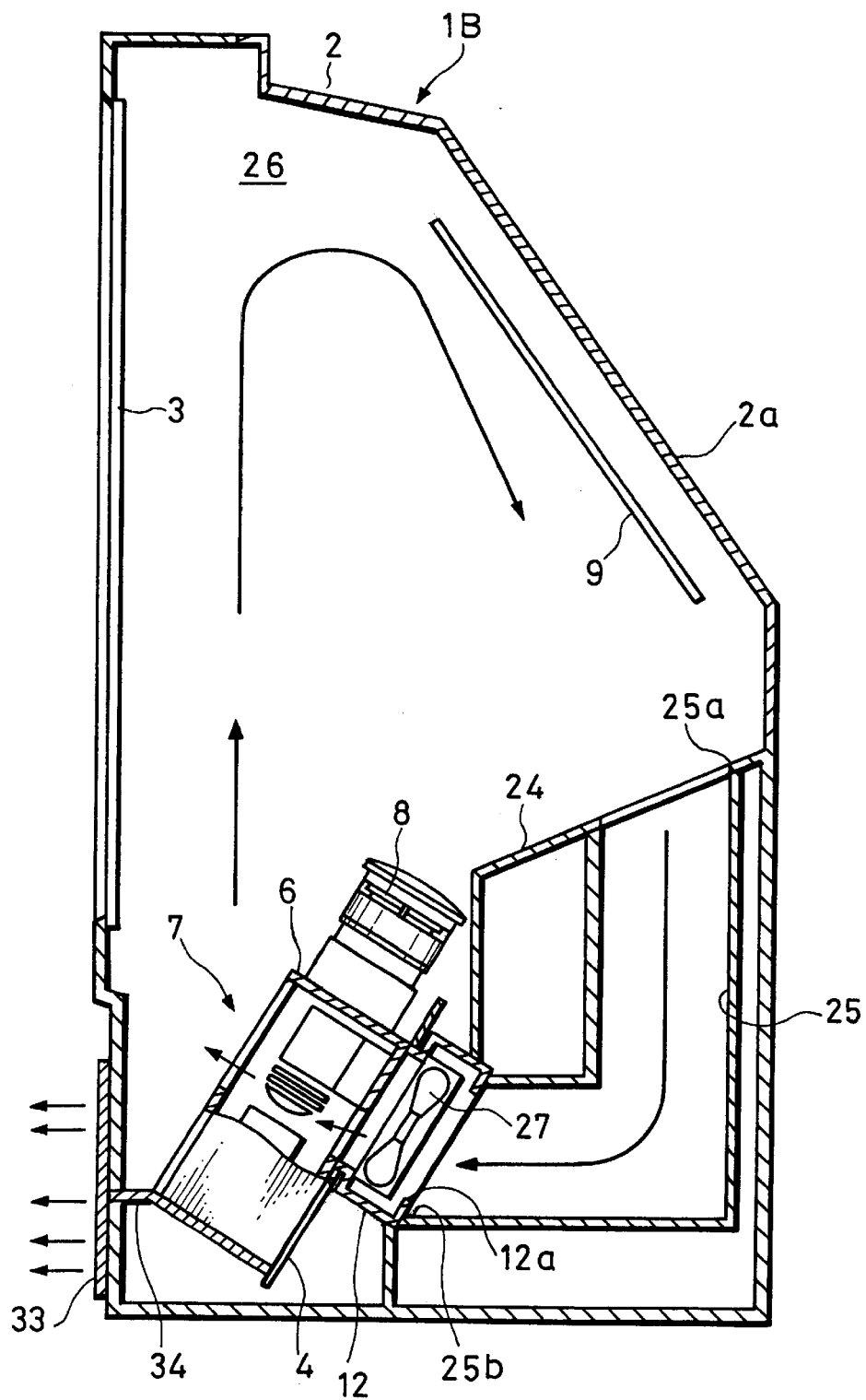
FIG. 8 is a longitudinal sectional view showing a third embodiment obtained by applying the present invention to a liquid-crystal projector system.

FIG. 8 shows a third embodiment constituted by applying the present invention to a liquid-crystal projector system. The liquid-crystal projector system 1B of this embodiment is provided with means for directly discharging the heat of an optical block 6 to the outside of a housing 2.

That is, a radiator 33 constituted by a material superior in heat conductivity is provided to the front lower portion of the housing 2 so as to be exposed and the radiator 33 and the case 10 of the optical block 6 are connected with each other by a conductive member 34 superior in heat conductivity such as a heat-pipe or the like. Thereby, the heat produced in the optical block 6 and conducted to the case 10 is radiated to the outside of the housing 2 by the radiator 33 through the conductive member 34.

Though the above configurations individually have an effect, it is also possible to use a plurality of the configurations by combining them.

Moreover, in the case of the liquid-crystal projector systems 1, 1A, and 1B, the screen 3 is located in the housing 2. However, it is also permitted to use a structure in which a screen is set outside of a closed structure and attached to the front of a display unit.

Furthermore, the present invention makes it possible to separately provide the first cooling means for cooling the light source 5 and the second cooling means for cooling the optical block 6 and thereby, use optimum cooling means respectively corresponding to the light source 5 and the optical block 6, and independently perform cooling without receiving an influence of mutual cooling means.

It is possible to use each of the cooling means described above as the second cooling means for cooling the optical block 6.

Moreover, it is possible to use each of means to be described later as the first cooling means for cooling the light source 5.

Figure 9:
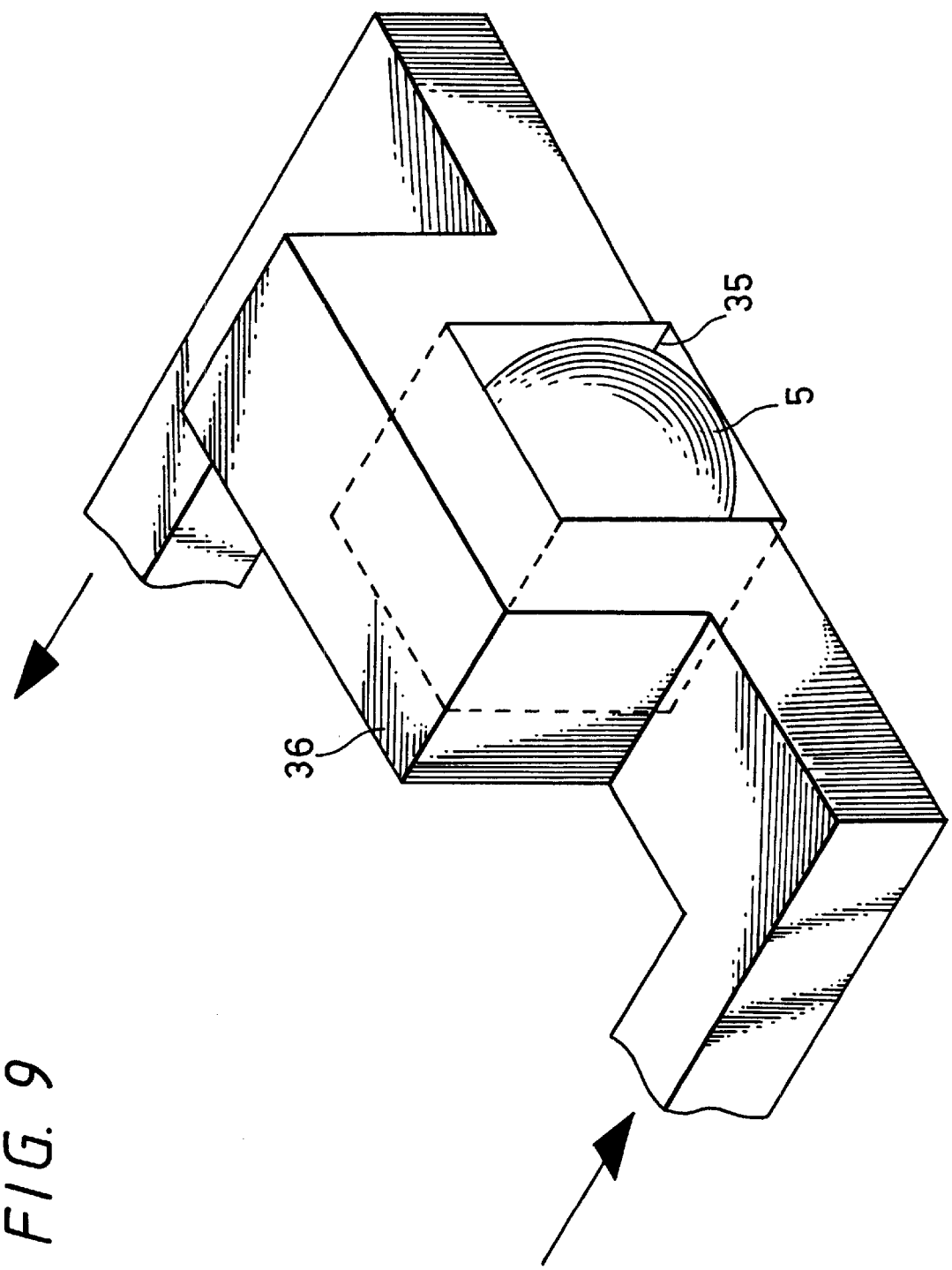
FIG. 9 is a perspective view showing means for cooling a light source.

The means shown in FIG. 9 is provided with a duct 36 through which cooling air passes along a surrounding wall 35 surrounding the light source 5 such as a halogen lamp or the like.

Moreover, the light source 5 is cooled by circulating the cooling air through the duct 36 in accordance with natural convection or forced circulation by air-flow generating means such as a fan or the like.

The above-mentioned surrounding wall 35 is opened at the side from which the light emitted from the light source 5 is emitted.

Figure 10:
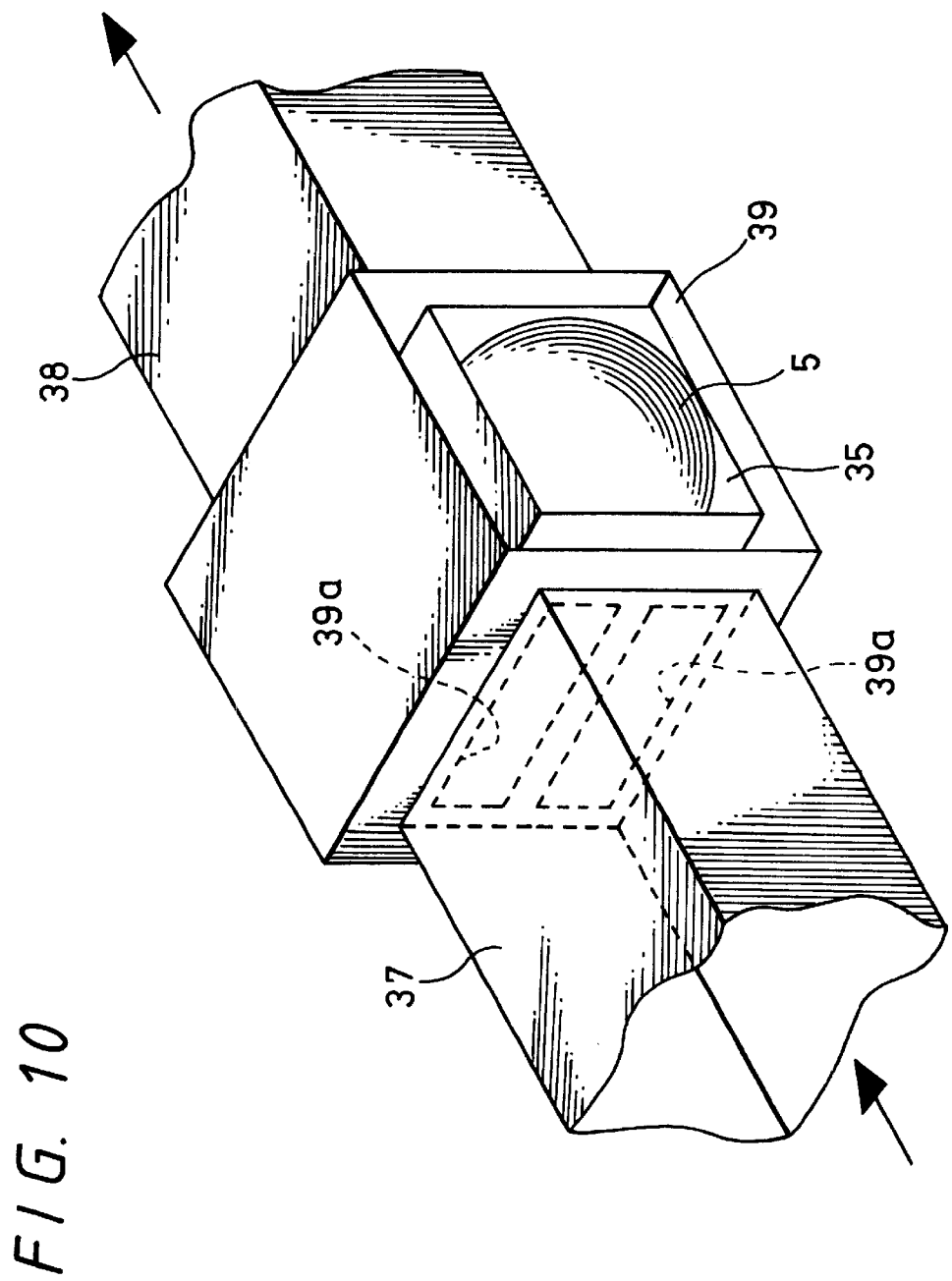
FIG. 10 is a perspective view showing another example of the means for cooling the light source.

The means shown in FIG. 10 is constituted by connecting an intake duct 37 and an exhaust duct 38 to a fixing member 39 fixing the surrounding wall 35.

Then, the cooling air is circulated through the ducts 37 and 38 in accordance with natural convection or forced circulation by the airflow generating means such as a fan or the like.

The above fixing member 39 is made of a heat-resistant molding resin or the like and has almost-rectangular openings 39a and 39a at its side so that air can be supplied to the surrounding wall 35 through the openings 39a and 39a.

Moreover, the surrounding wall 35 has a plurality of openings 35a, 35a, . . . (refer to FIG. 11) and thereby, it is possible to supply the air incoming from the openings 39a and 39a of the fixing member 39 to the light source 5 through the openings 35a, 35a, . . .

Figure 11:
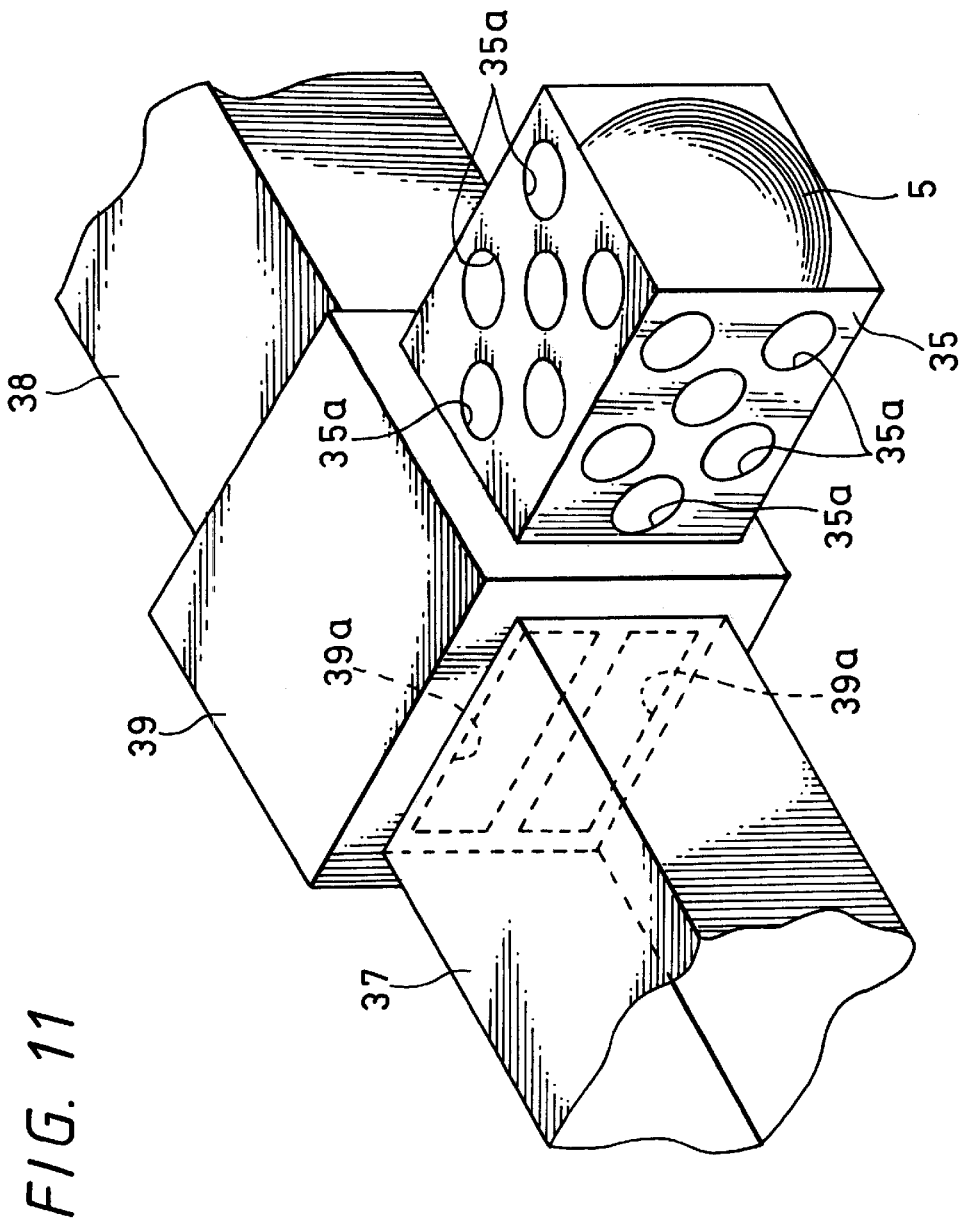
FIG. 11 is a perspective view showing a modification of the means in FIG. 10.

In the case of the above configuration, the light-source section including the surrounding wall 35 can be attached to or detached from the fixing member 39 (FIG. 11 shows such a state that the light-source section is taken out of the fixing member) and thereby, it is possible to easily replace the light source 5.

Moreover, it is permitted to constitute the fixing member 39 so as to have the opening 39a at the side face opposite to the illustrated side face. Furthermore, it is permitted to use only the intake duct 37 so that the air is exhausted through the openings 35a, 35a, . . . of the surrounding wall 35 and the openings 39a and 39a of the fixing member 39.

As described above, by providing the first cooling means for cooling the light source 5, it is possible to constitute proper cooling means corresponding to the light source 5 and optical block 6 which are greatly different from each other in calorific value as compared with the case where the light source 5 and the optical block 6 are cooled by the same cooling means.

Therefore, it is possible to improve each of the cooling efficiency of the light source 5 as well as the optical block 6.

Moreover, to increase degrees of freedom of design of the light source 5 and optical block 6, it is possible to more preferably constitute a display unit by considering various conditions such as operation costs including the manufacturing cost and power consumption of a display unit or the like.

Furthermore, because the light source 5 is less influenced by attachment of dust than the optical block 6 is, it is not always necessary to close the light-source section and it is enough for the first cooling means to have the above-described simple structure.

The shape and structure of each section shown for each embodiment described above are respectively only an example for embodying the present invention. Therefore, the technical scope of the present invention must not be restricted understood by them.

Having described preferred embodiments of the present invention with reference to the accompanying drawings, it is to be understood that the present invention is not limited to the above-mentioned embodiments and that various changes and modifications can be effected therein by one skilled in the art without departing from the spirit or scope of the present invention as defined in the appended claims.

What is claimed is:

1. A display unit comprising:
   a housing having a screen at its front and defined by a closed structure;
   an optical block set in the closed housing;
   connecting means for connecting the housing with the optical block to circulate air; and
   heat radiating means for radiating the heat of heated air to the outside through the housing which is formed by a pipe body communicating with an internal space of the housing so as to be in contact with outside air.

2. The display unit according to claim 1, wherein
   the heat radiating means includes a heat conductive member provided in the housing.

3. The display unit according to claim 1, wherein a heat radiating fin is attached to the pipe body.

4. The display unit according to claim 1, wherein
   the housing is provided with an air-flow restriction path for restricting a flow of air circulating through the housing.

5. The display unit according to claim 4, wherein
   a dust collector is provided on the way to the air-flow restriction path.

6. The display unit according to claim 1, and further including
   heat radiating means for exhausting heated air to the inside or outside of a closed space through the optical block.

7. The display unit according to claim 6 wherein
   the heat radiating means is formed by a heat conductive member provided in the optical block.

8. A display unit comprising:
   a housing having a screen at its front and defined by a closed structure;
   an optical block positioned in the closed housing;
   first cooling means for cooling a light source positioned in the housing for passing light through the optical block; and
   second cooling means for cooling the optical block.

9. The display unit according to claim 8, and further including
   connecting means for circulating air between the optical block and the housing.

10. A display unit comprising:
    a housing having a screen at its front and defined by a closed structure;
    an optical block set in the closed housing;
    connecting means for connecting the housing with the optical block to circulate air, and
    wherein the housing provided with an air-flow restriction path for restricting a flow of air circulating through the housing.

11. The display unit according to claim 10, wherein
    a dust collector is provided on the way to the air-flow restriction path.

* * * * *